(12) United States Patent
Gumbel

(10) Patent No.: US 6,393,379 B1
(45) Date of Patent: May 21, 2002

(54) CONTROLLER AREA NETWORK DIAGNOSTIC INSTRUMENT

(75) Inventor: Matthew J. Gumbel, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/941,108

(22) Filed: Aug. 28, 2001

Related U.S. Application Data
(60) Provisional application No. 60/229,770, filed on Sep. 1, 2000.

(51) Int. Cl.[7] .......................... G06F 11/30; G06F 15/00; G21C 17/00
(52) U.S. Cl. ............................ 702/183; 701/1; 370/241
(58) Field of Search .................................. 340/438, 515; 701/1, 29, 31; 702/183; 370/241, 242

(56) References Cited

U.S. PATENT DOCUMENTS

| | | | | |
|---|---|---|---|---|
| 5,908,455 A | * | 6/1999 | Parvahan | 701/29 |
| 5,949,330 A | * | 9/1999 | Hoffman et al. | 340/438 |
| 6,263,269 B1 | * | 7/2001 | Dannenberg | 701/1 |
| 6,272,402 B1 | * | 8/2001 | Kelwaski | 307/9.1 |
| 2001/0013826 A1 | * | 8/2001 | Ahmed et al. | 340/439 |

* cited by examiner

Primary Examiner—Patrick Assouad
(74) Attorney, Agent, or Firm—Jeffrey P. Calfa; Neil T. Powell; Dennis Kelly Sullivan

(57) ABSTRACT

A controller area network diagnosis instrument for diagnosis and evaluation of electronic components on a vehicle control system 10. The controlled area network diagnostic instrument (CANDI) includes a computer processor 119 with a graphics display 121. The processor 119 has a cable 132 to plug into the diagnostic connector 36 engaged to a common data bus 18 of the vehicle 101. The processor 119 is programmed to graphically show a mock gauge cluster or vehicle instrument panel 120 on the display 121 in that has the same appearance as a real vehicle gauge cluster or vehicle instrument panel 102. When connected to the diagnostic connector, the processor 119 mines data off of the data bus 18 and converts it into human readable form on the display 121. This may take the form of mock conventional gauges 124, mock warning lights 105, mock switch status 123, or mock LCD displays 126 shown via computer graphics on the processor's display 121.

11 Claims, 5 Drawing Sheets

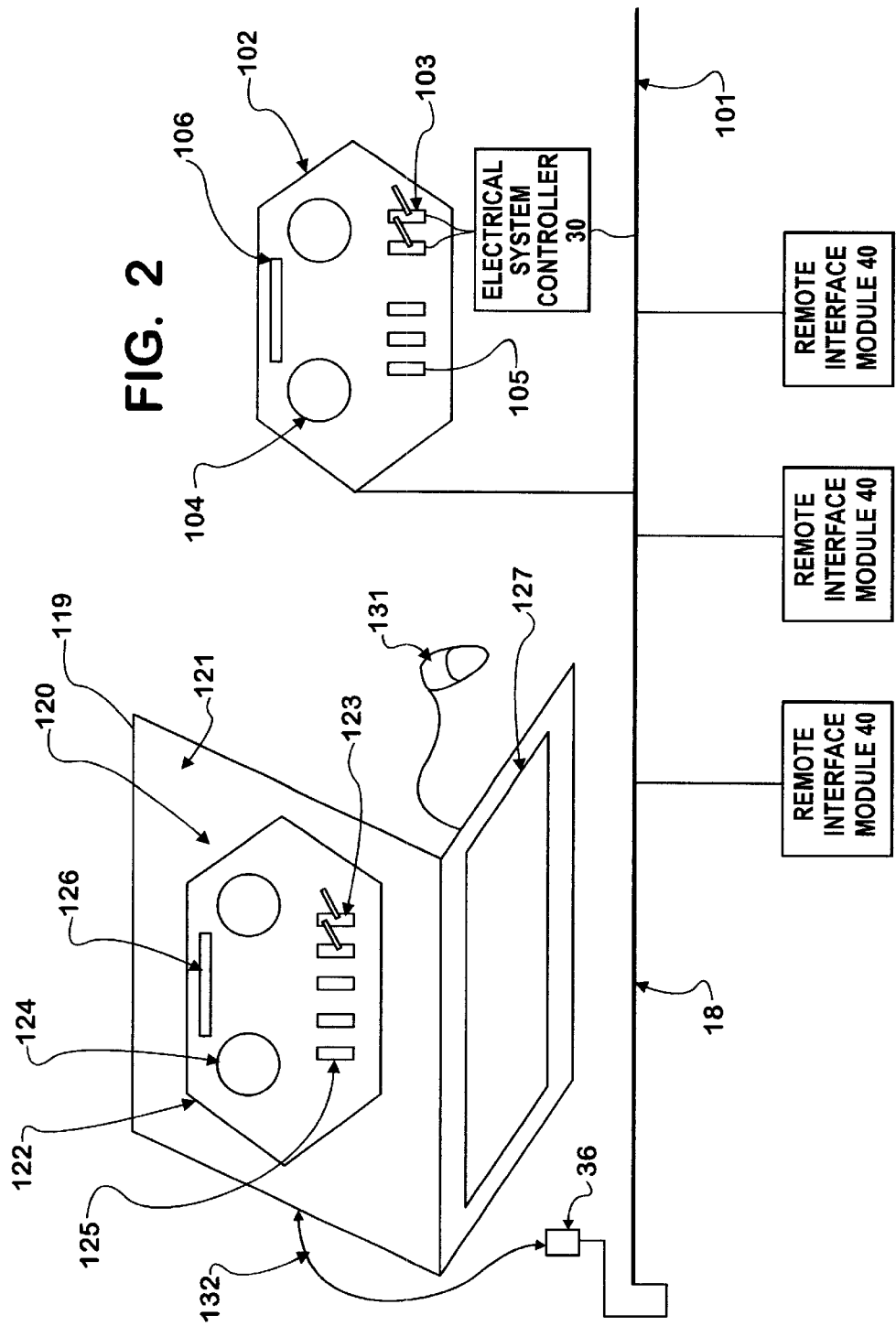

PROCESS TO DISPLAY MESSAGE RECEIVED ON DATALINK BY CANDI

PROCESS TO SEND MESSAGE AS DISPLAYED ON CANDI COMPUTER INTERFACE

NOTE: GAUGE MAY MEAN WARNING LIGHT, SWITCH STATUS OR LCD DISPLAY

PROCESS FOR DISPLAY OF MESSAGES ON CANDI

PROCESS FOR SENDING MESSAGES ON CANDI

CONTROLLER AREA NETWORK DIAGNOSTIC INSTRUMENT

This is a non-provisional patent application claiming priority of provisional patent application serial No. 60/229,770, filed Sep. 1, 2000.

BACKGROUND

This invention relates to a diagnostic instrument for communicating with and providing diagnostic information on instruments such as gauges, indicating lights, numeric displays, and switches in the cab or driver area of a mobile vehicle and the algorithm for assisting in the communication and display of the diagnostic information. The instrument makes use of existing industry standard or proprietary communication protocols and a vehicle mounted controlled area network to communicate with and provide diagnostic information on the vehicle instruments. This application is related to U.S. Pat. No. 6,263,269 that is assigned to inventor's assignee.

PRIOR ART

At a simple level, communication between two agents may be kept physically separated from communications occurring among other agents. Where two or more signals do not use the same physical space, there is no need to separate the signals in time or in carrier wave frequency. Such a communications regime is sometimes termed physical division multiplexing although the term multiplexing is usually reserved to techniques for applying multiple signals to a single medium or physical space. So-called physical division multiplexing describes how motor vehicles have been traditionally wired. The use of separate dedicated wires to connect each switch and lamp is a type of physical division multiplexing. Obviously, physical division multiplexing, while simple in concept, results in the use of many wires (the classical motor vehicle electrical harness), which are difficult to install during manufacturing and problematic to maintain in the field.

Arrangements allowing a number of agents to communicate over a common physical layer or medium offer much greater physical simplicity. Intelligible communication between two or more devices among a greater plurality of devices, all over a common medium, depends upon the communicating devices being able to distinguish, and understand, messages directed to them from other messages which they receive, but which are not intended for them. The process of distinguishing messages depends upon the transmitter of the message applying some attribute to the message that identifies it to the intended recipient. In human conversation, most people readily distinguish speech directed to them from interfering cross-talk in a crowd by the distinctive aspects of the voice of the person addressing them. Where the members of the group are electrical components, the problem still involves identification of a distinguishing attribute of the signal. Appropriate attributes for signals take a number of forms.

A line communicating a signal from a remote switch to a lamp to turn on or off (by having a second switch, local to the lamp, change states to control connection of the lamp between a power bus and ground) cycles only rarely. In a typical trip such a change in state occurs only once or twice, if at all. Where such a line is not intended to provide power to the lamp, and simply indicates changes in state for the local switch controlling the lamp, the line will have the capacity to handle far more data than the occasional indications to turn a lamp on and off. The objective of maintaining simplicity in manufacturing and maintenance are preferably met by allowing communication among a number of components to occur in a single medium, or at least as few communication lines as possible. The line used to connect switch and lamp could interconnect a number of components, carrying messages between any grouping of elements connected to the line when not required to carry an instruction to a lamp to turn on. One way of achieving this objective is a communications regime that divides time into slots during which particular combinations of components have use of a signaling line. Such methods are well known in the art and are examples of time division multiplexing (TDM). In motor vehicles, time division and related multiplexing techniques offer substantial simplification in physical layer required to support the control of vehicle vocations.

Rigid time division multiplexed communications appear to interleave data signals into a single serial signal over a single physical medium. Multiplexed communication systems also provide the reverse function (de-multiplexing) of dividing the single signal into multiple, non-synchronous digital signals. Where demands on the capacity of the data transmission medium are not especially heavy, any unit may be allowed to claim the medium provided collision detection is provided for and other indicia, such as address headers, indicate the signal's destination.

As applied to motor vehicles, multiplexed communications over serial data paths are an effective technique for reducing the number of dedicated communication paths between the numerous switches, sensors, devices and gauges installed on the vehicles. With each increase in the number and variety of accessories and functions installed on each vehicle, the benefits of using a single, multiplexed communication serial link for passing instructions to and receiving information from vehicle devices as diverse as running lights and rear axle temperature sensors becomes greater. Multiplexing the signals to and from local controllers and switches for vehicle systems promises greater physical simplicity through displacing much of the vehicle wiring harness, reducing manufacturing costs, facilitating vehicle electrical load management, and enhancing system reliability.

The specific manner of implementing multiplexed communications is outside the scope of the present invention, which applies a defined protocol, the SAE J1939 protocol. Additionally, proprietary protocols may be used although over a network similar to as described here. The development by the Society of Automotive Engineers of the J1939 series of standards for multiplexed communications testifies to the progress in the application of multiplexed communications to vehicles. Standards have been or are being developed relating the communication path, transmission collision detection, diagnostic ports and data protocols, among other topics. The J1939 protocol provides an open protocol and definition of the performance requirements of the medium of the physical layer, but also allows for development of proprietary protocols. The SAE J1939 protocol is a specialized application of a controlled area network (CAN) and may be readily implemented utilizing commercial integrated circuits such as the C167 Integrated Circuit from Siemens of Germany.

A serial communications system utilizing a multiplexing regime can link several remote digital controllers positioned around a vehicle with an electrical system controller (ESC) for two way communication. Remote digital controllers are addressable, allowing them to respond to signals intended for them initialize particular functions. As described above the controllers for the vehicle instruments may be remote digital controllers. They may also include programming that allows the device to react to local conditions as well as condition indicating signals provided the controller. The ESC may pass requests and instructions received for operations of certain devices, addressed to the correct remote controller, in a fashion to condition the timing and duration of the responses to requests to better manage overall vehicle electrical load.

Electronic modules and components that communicate under protocols such as J1939 may require diagnosis or troubleshooting. In the prior art, such modules and components were diagnosed and electrically examined using an instrument that translated data to hexadecimal numbers that were then interpreted by an engineer using a calculator. Messages were constructed in the same time consuming manner. Diagnosis of components that communicate under J1939 or other similar protocols was not user friendly and in no case included a mock simulated gauge cluster or vehicle instrument panel for easy relation of actual gauge cluster and vehicle instrument panel diagnosis.

What is needed and does not exist in the prior art is a user-friendly vehicle controlled area network diagnostic instrument for diagnosing electronic modules and components that communicate under J1939 or similar communication protocols and includes a mock simulated gauge cluster or vehicle instrument panel for easy relation of actual gauge cluster and vehicle instrument panel diagnosis.

SUMMARY

An object of the invention is to provide is a user-friendly vehicle controlled area network diagnostic instrument for diagnosing electronic modules and components that communicate under J1939 or similar communication protocols. A second object of the invention is to provide for a diagnostic tool for mobile vehicle applications that includes a mock simulated gauge cluster or vehicle instrument panel for easy relation of actual gauge cluster and vehicle instrument panel diagnosis.

The controlled area network diagnostic instrument (CANDI) and computer algorithm for programming computers to allow vehicle instrument diagnosis of this invention satisfies all the objects of the invention and others not mentioned. The diagnostic tool of this invention may be a computer processor either portable or fixed with graphics display such as a monitor. The processor has a cable and adapter to plug or hook into diagnostic connector engaged to a common data bus of the vehicle, which may be a serial data bus or link. The serial data bus or link is made in accordance with J1939, other industry electronic communication standards, or proprietary standards. The processor has a display that is programmed to graphically show a mock or simulated gauge cluster or vehicle instrument panel in that has the same appearance as a real vehicle gauge cluster or vehicle instrument panel. A vehicle subject to the diagnostics of CANDI will have a real vehicle gauge cluster of the vehicle electrically engaged to the common data bus, as will be an Electrical System Controller (ESC). The ESC controls the flow of communication over the data bus. When connected to the diagnostic connector, the CANDI takes or mines data off of the data bus and converts it into human readable form. This may take the form of conventional gauges, warning lights, switch status, or LCD displays shown via computer graphics on the processor's monitor. This may take the form of a mock or simulated gauge cluster or vehicle instrument panel. Where there are no changes in data, the mock display appears like a picture of the real gauge cluster or vehicle instrument panel. Where the mined data changes, the CANDI converted human readable form will make the mock display appear like a moving picture of the real display. Likewise, CANDI may take the human readable data and put it on the data bus. This may result in the ESC or other remote interface modules driving or directing the movement of actual gauges, switches, warning lights, or LCD displays to vary their display. This human readable data may be input into the CANDI processor by use of a computer mouse or other pointer to change the position of switches and gauge needles shown on the mock display or use of the key pad to input numeric into selected numeric indicators on the mock display.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2 is a block diagram of the control network for the vehicle of FIG. 1 shown with a controlled area network diagnostic instrument made in accordance with this invention installed for diagnosis;

DETAILED DESCRIPTION OF THE INVENTION

Figure 1:
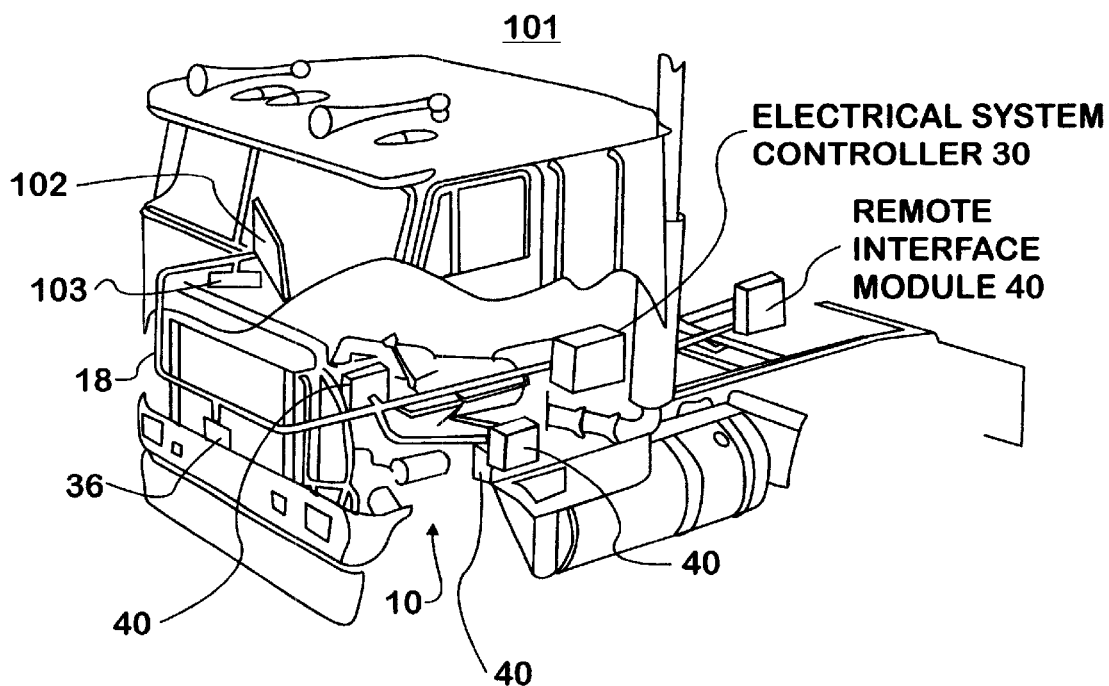
FIG. 1 is a perspective view of a portion of a vehicle upon which a controlled area network diagnostic instrument made in accordance with this invention may be engaged and used to evaluate the vehicle.

The controller area network diagnosis instrument of this invention may be used for diagnosis and evaluation of electronic components on a vehicle control system 10 installed on a mobile vehicle 101. See FIGS. 1 and 2. The vehicle control system 10 comprises an electrical system controller (ESC) 30, which is the primary component of a vehicle electronic control system 10. The ESC 30 manages a number of controllers 40 disposed on vehicle 101 and executes a load management program which oversees the total load imposed on the vehicle electrical system and power train by various accessories installed on the vehicle. Most active vehicle components are directly controlled by one of a group of controllers 40, which includes a gauge cluster or display 102, all of which are connected to ESC 30 over the common data bus which may be a serial data bus or link 18. The controllers 40 include local data processing and programming and are typically supplied by the manufacturer of the controlled component. The gauge cluster 102 may include gauges 104, indicators or warning lights 105, and LCD or other numeric displays 106 and mechanically engaged to a switch bank 103. Serial data link 18 may be a twisted pair cable constructed in accordance with SAE standard J1939 or other industry or proprietary standard and is externally accessible via a diagnostic port 36. In the alternative to the diagnostic port, the serial data link 18 may include a transceiver for external communication such as by microwave, radio, ultra-sound, or infrared waves. In any case there will be a communication port for the serial data link 18 for external communication. Although the controllers 40 may handle many functions locally and are functionally difficult without reference to ESC 30, they report data to ESC 30 and can receive operational requests from ESC 30. The alternative common data bus 18 may operate using proprietary communication protocol other than an industry standard.

The controlled area network diagnostic instrument (CANDI) includes a computer processor 119. See FIG. 2. The processor 119 includes a graphics display 121 such as a monitor. The processor 119 may have a cable and adapter 132 to plug or hook into the diagnostic connector 36 engaged to the common data bus 18 of the vehicle 101. In the alternative, the processor 119 will have a transceiver for communication with a transceiver engaged to the data bus 18. The serial data bus or link 18 is made in accordance with J1939, other industry electronic communication standards, or proprietary standards. The processor 119 has a display 121. The processor 119 is programmed to graphically show a mock or simulated gauge cluster or vehicle instrument panel 120 on the display 121 in that has the same appearance as a real vehicle gauge cluster or vehicle instrument panel. When connected to the diagnostic connector, the CANDI processor 119 takes or mines data off of the data bus 18 and converts it into human readable form on the display 121. This may take the form of mock conventional gauges 124, mock warning lights 105, mock switch status 123, or mock LCD displays 126 shown via computer graphics on the processor's display 121. This may take the form of a mock or simulated gauge cluster or vehicle instrument panel 120. Where there are no changes in data, the mock display 120 appears like a picture of the real gauge cluster or vehicle instrument panel 102. Where the mined data changes, the CANDI processor converted human readable form will make the mock display 120 appear like a moving picture of the real display 102. Likewise, CANDI may take the human readable data and put it on the data bus 18. This may result in the ESC 30 or other remote interface modules or controllers 40 driving or directing the movement of actual gauges 104, switches 103, warning lights 105, or LCD or numeric displays 106 to vary their display. This human readable data may be input into the CANDI processor by use of a computer mouse, track ball or other pointer 131. The pointer 131 to change the position of mock switches 123 and needles of the mock gauges 124 shown on the mock display 120 or use of the key pad 127 to input numerals into selected numeric indicators 126 on the mock display.

In the alternative, the display 121 may a touch sensitive screen and the user may change the position of mock switches 123 and needles of the mock gauges 124 shown on the mock display 120 by touching the screen.

Figure 3A:
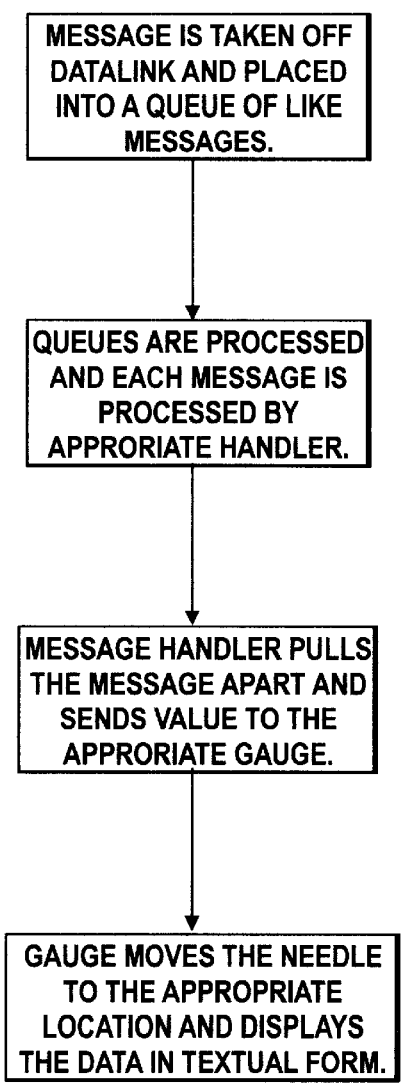
FIG. 3 is a high level block diagram showing the logic that may be programmed into the controlled area network diagnostic instrument of FIG. 2.
Figure 3B:
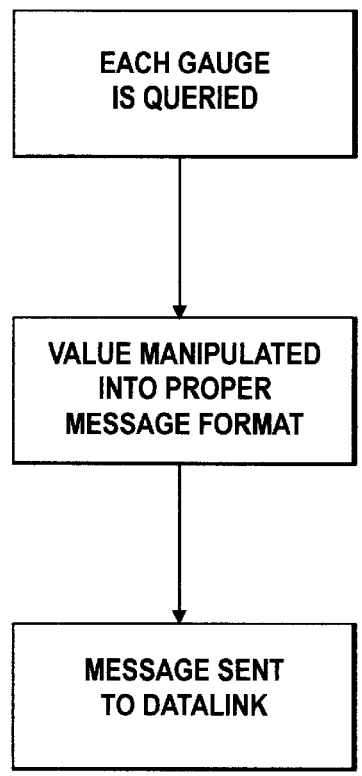
Figure 4:
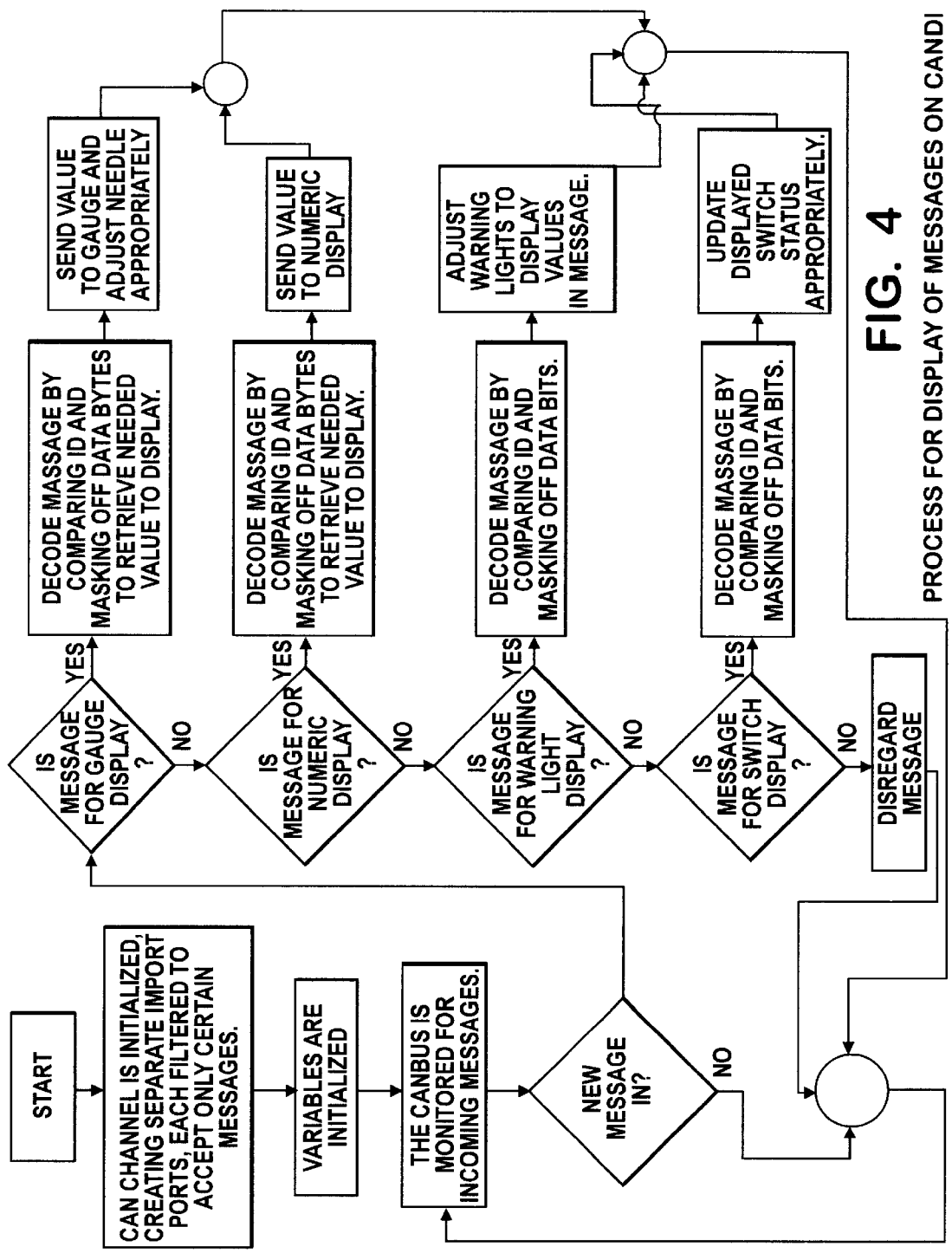
FIG. 4 is a block level diagram showing an embodiment of the controlled area network diagnostic instrument process for display of messages.
Figure 5:
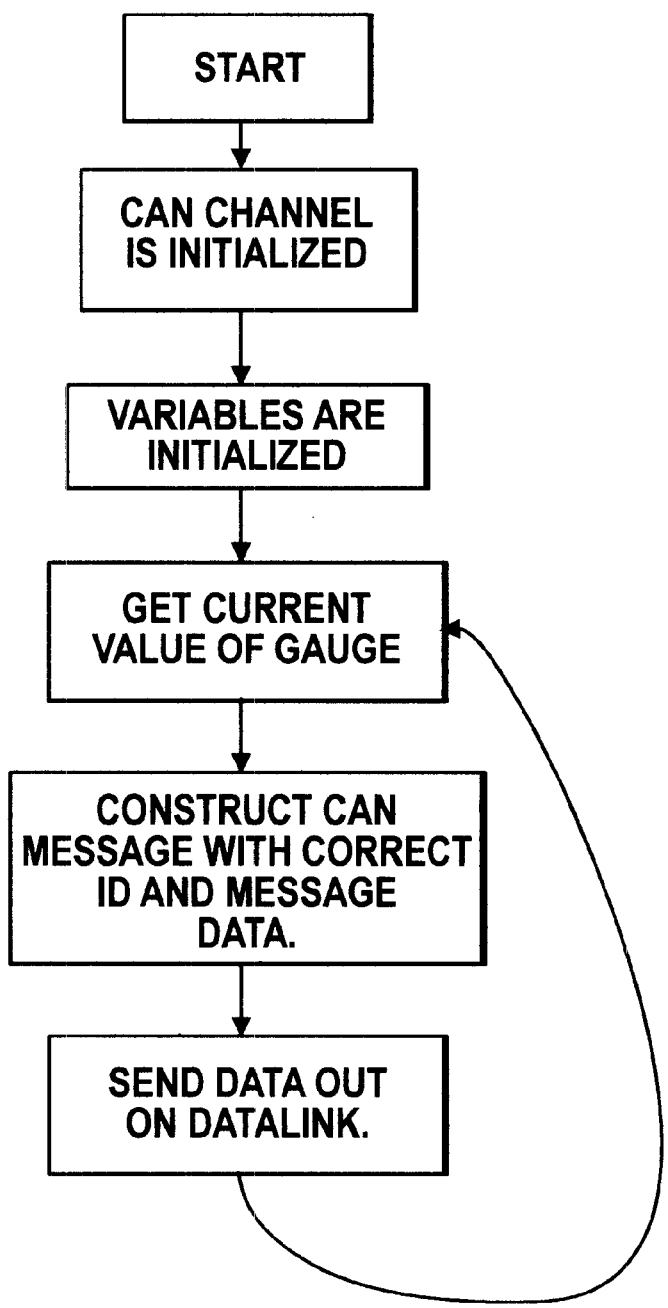
FIG. 5 is a block level diagram showing the controlled area network diagnostic instrument process for sending messages on the instrument.

FIGS. 3 to 5 provide embodiments of the programming algorithms for the CANDI processor 119 or other processors that may be used to provide the diagnostic information and evaluation of gauges and displays of a vehicle. FIG. 3A demonstrates a simplified embodiment of the process of converting information that the processor 119 receives or mines from the data bus 18 in regards to changes of the displayed output of the vehicle's gauge cluster or display 102. The message or data is taken off the data bus and placed in a cue of messages. An appropriate message handler within the processor 119 processes the queues. The message handler dissects or pulls the message apart, extracting the gauge value for example on a gauge 104 of the vehicle and sends the message to the display controller for the mock gauge 124. The graphic display controller directs the gauge to move the needle for the mock gauge 124 to show the needle moving to the appropriate location to mock the real gauge 104. FIG. 3B demonstrates a simplified embodiment of the process of changing the displayed output of the mock gauge cluster or display 120 and having that change correspondingly displayed on the real gauge cluster or display 102. The user of the processor 119 makes a change to the display gauge, instrument or switch. The change is made using the keypad 127 or mouse or pointer 131. The display controller for the mock gauges 104 other mock instruments or switch is queried for changes by the processor 119. The value sensed is manipulated into a proper message format for transmission over the vehicle data bus 18. The message directing a change to the vehicle gauge cluster or display 102 is sent to the data bus 18 where the applicable ESC 30 or controller 40 directs the actual change on the real instrument or switch. The changes applied to either the mock or real displays are compared to determine communication continuity as well as electrical continuity and control.

FIG. 4 is a more detailed embodiment of the process for display of messages on the CANDI processor 119. The processor 119 upon installation on the CAN bus at the diagnostic port 36 initiates separate import ports, each filtered to accept only certain messages. The variables are initialized and then the CAN bus is monitored for incoming messages. The processor 119 evaluates each message and should there be an older message, the processor 119 continues to monitor. Should a message be a new message then the processor 119 evaluates if the message is for gauge display. If the message is for gauge display, then the processor 119 decodes the message by comparing ID, masking off data bytes to retrieve needed values of gauge 104 for display. The processor then sends the value to the mock gauge 124 for adjustment of the mock gauge 124 to correct the readout. Then the processor continues to monitor the CAN bus. If the new message is not for gauge display, then the processor evaluates if the message is for numeric display. If the new message is for numeric display, then the processor decodes the message by comparing ID, masking off data bytes to retrieve needed values of the numeric display 106 for display. The processor 119 then sends the value to the mock numeric display 126 for adjustment of the mock numeric display 126 to correct the numeric readout. Should the new message not be for gauge display or for numeric display, then the processor 119 evaluates if the message is for a warning light display. If the new message is for warning light display, then the processor decodes the message by the accompanying ID and masks off the data bytes to retrieve the warning light 105 conditions. The processor 119 adjusts the mock warning lights 125 to display the conditions of the message. If the new message is not for gauge display, numeric display, or warning light display, the processor 119 evaluates if the message is for switch display. If the message is for switch display, the processor decodes the message by comparing the ID and masking off the data bytes to retrieve switch 103 conditions. The processor 119 adjusts mock switch 123 positions. If the new message, does not meet any of the filter requirements, the processor 119 continues to monitor the CAN bus.

FIG. 5 is a more detailed embodiment of the process of sending messages on CANDI that start as changes to the processor display 121 and end as changes to gauges, displays, and switches on the vehicle 101. The example shown is for adjusting gauges 104, however a similar process can be used for numeric indicators 106 and warning lights 105. Upon installation on the CAN bus, the processor 119 initiates a CAN bus channel. Variables are initiated. The processor 119 queries along the common data bus 18 to determine current gauge 104 positions. The processor 119 is adjusted by the user to adjust mock gauge 124 position. The processor constructs a CAN message with correct ID and message data and sends the message along the data link 18 where the ESC 30 or controller 40 that controls the particular gauge 104 or condition to be changed. The processor 119 continues to monitor the CAN bus for current values of gauges 104.

The controllers 40 are general-purpose control interfaces allowing the attachment of various accessories to vehicle 101. The controllers 40 provide a plurality of ports providing for each of the following: analog inputs; analog outputs; digital inputs; and digital outputs. Characterization of a particular port as, for example, an output port does not necessarily mean that it functions exclusively as an output port. For example, an output port may include voltage drop sensing elements, current flow sensing elements, or both, allowing determination by ESC 30 of whether, for example, a bulb in a lamp connected to the output port is operative, or whether a short circuit condition exists in an attached device.

As described above, the controller area network diagnosis instrument provides a number of advantages, some of which have been described above and others of which are inherent in the invention. Also modifications may be proposed to the controller area network diagnosis instrument without departing from the teachings herein.

I claim:

1. A controlled area network diagnostic instrument for diagnosis and evaluation of electronic components on a vehicle control system on a mobile vehicle, the vehicle control system including an electrical system controller and other controllers on the vehicle, the electrical system controller and the other controllers communicating over a serial data bus, the serial data bus having a communication port, the controllers including a gauge cluster that may include indications of vehicle status, comprising:

a processor including a graphics display;

a communications port for communicating with the vehicle data bus communication port;

said processor programmed to graphically provide a visual image of a mock gauge cluster on said display, said mock gauge cluster having the appearance of the actual vehicle gauge cluster;

said processor programmed to mine data off said data bus when said processor in communication with said communication port of the vehicle serial data bus; and said processor programmed to convert data from said vehicle serial data bus into human readable form on said graphics display; providing said mock gauge cluster with indications and switch positions of the vehicle gauge cluster and making said mock display a moving picture of the vehicle gauge cluster when the indications of the vehicle gauge cluster change.

2. The controlled area network diagnostic instrument of claim 1, wherein:

said processor programmed to accept user input to said processor to change said indications displayed on said mock cluster and to transmit messages over the serial bus to direct a controller to change actual vehicle gauge cluster indications to change with said mock cluster.

3. The controlled area network diagnostic instrument of claim 2, wherein:

said processor accepts user input from a pointer to change indications on said mock cluster.

4. A controlled area network diagnostic instrument for diagnosis and evaluation of electronic components on a vehicle control system on a mobile vehicle, the vehicle control system including an electrical system controller and other controllers on the vehicle, the electrical system controller and the other controllers communicating over a serial data bus, the serial data bus having a communication port, the controllers including a gauge cluster that may include gauges, switches, warning lights, or numeric displays, comprising:

a processor including a graphics display;

a communications port for communicating with the vehicle data bus communication port;

said processor programmed to graphically provide a visual image of a mock gauge cluster on said display, said mock gauge cluster having the appearance of the actual vehicle gauge cluster;

said processor programmed to mine data off said data bus when said processor in communication with said communication port of the vehicle serial data bus;

said processor programmed to convert data from said vehicle serial data bus into human readable form on said graphics display; providing said mock gauge cluster with indications and switch positions of the vehicle gauge cluster and making said mock display a moving picture of the vehicle gauge cluster when the gauges, switches, warning lights, or numeric displays change; and said processor programmed to accept user input to said processor to change said indications displayed on said mock cluster and to transmit messages to direct the actual vehicle gauge cluster gauges, warning lights, or numeric displays to change with said mock cluster on the processor display.

5. The controlled area network diagnostic instrument of claim 4, wherein:

said processor programmed to accept user input to change said mock cluster from a pointer and a keyboard of the processor.

6. A controlled area network diagnostic instrument for diagnosis and evaluation of electronic components on a vehicle control system on a mobile vehicle, the vehicle control system including an electrical system controller and other controllers on the vehicle, the electrical system controller and the other controllers communicating over a serial data bus, the serial data bus having a communication port, the controllers including a gauge cluster that may include indications of vehicle status, comprising:

a processor including a graphics display;

a communications port for communicating with the vehicle data bus communication port;

said processor programmed to graphically provide a visual image of a mock gauge cluster on said display, said mock gauge cluster having the appearance of the actual vehicle gauge cluster; and said processor programmed to accept user input to said processor to change said indications displayed on said mock cluster and to transmit messages over the serial bus to direct a vehicle controller to change actual vehicle gauge cluster indications to change with said mock cluster.

7. A controlled area network diagnostic instrument for diagnosis and evaluation of electronic components on a vehicle control system on a mobile vehicle, the vehicle control system including an electrical system controller and other controllers on the vehicle, the electrical system controller and the other controllers communicating over a serial data bus, the serial data bus having a communication port, the controllers including a gauge cluster that may include indications of vehicle status, comprising:

a processor including a graphics display;

a communications port for communicating with the vehicle data bus communication port;

said processor programmed to graphically provide a visual image of a mock gauge cluster on said display, said mock gauge cluster having the appearance of the actual vehicle gauge cluster; and said processor programmed for the steps of:

mining data off the vehicle data bus;

placing data in a queue of messages;

processing the queue of message with a message handler within said processor;

dissecting the messages apart with said message handler;

extracting indicator values from the indicator of the gauge cluster of the vehicle; and sending the message to the display for display on the mock gauge cluster to mock the real cluster and making said mock cluster a moving picture of the vehicle gauge cluster when the indications of the vehicle cluster change.

8. The controlled area network diagnostic instrument of claim 7, wherein:

said processor programmed for the steps of:

accepting user input to said processor to change indications displayed on said mock cluster display;

querying a display controller for indications on said mock cluster;

manipulating values of indications on said mock cluster into message format for transmission over the vehicle data bus; and sending a message to change indications on the vehicle cluster to the vehicle data bus where a controller directs actual change on the vehicle cluster.

9. A controlled area network diagnostic instrument for diagnosis and evaluation of electronic components on a vehicle control system on a mobile vehicle, the vehicle control system including an electrical system controller and other controllers on the vehicle, the electrical system controller and the other controllers communicating over a serial data bus, the serial data bus having a communication port, the controllers including a gauge cluster that may include gauges, switches, warning lights, or numeric displays, comprising:

a processor including a graphics display;

a communications port for communicating with the vehicle data bus communication port;

said processor programmed to graphically provide a visual image of a mock gauge cluster on said display, said mock gauge cluster having the appearance of the actual vehicle gauge cluster;

said processor programmed to mine data off said data bus when said processor in communication with said communication port of the vehicle serial data bus;

said processor programmed for the steps of:

mining data off the vehicle data bus;

placing data in a queue of messages;

processing the queue of message with a message handler within said processor;

dissecting the messages apart with said message handler;

extracting values related to conditions of vehicle gauge cluster gauges, switches, warning lights, or numeric displays of the gauge cluster of the vehicle; and sending the message to the display for display on the mock gauge cluster to mock the real cluster and making said mock cluster a moving picture of the vehicle gauge cluster when the conditions of vehicle gauge cluster gauges, switches, warning lights, or numeric displays of the vehicle cluster change; and said processor programmed for the steps of:

accepting user input to said processor to change conditions of vehicle gauge cluster gauges, warning lights, or numeric displays displayed on said mock cluster display;

querying a display controller for conditions of vehicle gauge cluster gauges, warning lights, or numeric displays on said mock cluster;

manipulating values of of vehicle gauge cluster gauges, warning lights, or numeric displays on said mock cluster into message format for transmission over the vehicle data bus; and sending a message to change conditions of vehicle gauge cluster gauges, warning lights, or numeric displays on the vehicle cluster to the vehicle data bus to a controller to direct actual change on the vehicle cluster.

10. A controlled area network diagnostic instrument for diagnosis and evaluation of electronic components on a vehicle control system on a mobile vehicle, the vehicle control system including electrical controllers on the vehicle, the electrical controllers communicating over a serial data bus, the serial data bus having a communication port, and the controllers including a gauge cluster that may include indications of vehicle status, comprising:

a processor including a graphics display;

a communications port for communicating with the vehicle data bus communication port;

said processor programmed to graphically provide a visual image of a mock gauge cluster on said display, said mock gauge cluster having the appearance of the actual vehicle gauge cluster; and said processor programmed for the steps of:

upon making communication with said vehicle data bus initiating separate import ports, each filtered to accept only certain messages;

initializing variables and then monitoring the vehicle data bus for incoming messages;

evaluating each message and should there be an older message, continuing to monitor;

should a message be a new message, evaluating if the new message is for gauge display, and if the message is for gauge display performing the steps of:

decoding the message by comparing ID, masking off data bytes to retrieve needed values of a gauge for display; and sending the value to a mock gauge on said mock cluster for adjustment of said mock gauge to correct readout along the data bus;

should a message be a new message and the new message is not for gauge display, evaluating if the new message is for numeric display, and if the message is for numeric display performing the steps of:
  decoding the message by comparing ID, masking off data bytes to retrieve needed values of a numeric display for display; and
  sending the value to a mock numeric display on said mock cluster for adjustment of the mock numeric display to correct numeric readout along the data bus;
should a message be a new message and the new message is not for gauge display or for numeric display, evaluating if the new message is for warning light display, and if the message is for warning light performing the steps of:
  decoding the message by the accompanying ID and masking off the data bytes to retrieve the warning light conditions; and
  adjusting the mock warning lights to display the conditions of the message along the data bus;
should a message be a new message and the new message is not for gauge display, numeric display, or for warning light display, evaluating if the new message is for switch display, and if the message is for switch performing the steps of:
  decoding the message by comparing the ID and masking off the data bytes to retrieve switch conditions; and
  adjusting mock switch positions to display the conditions of the message along the data bus; and
should a new message not meet any of the filter requirements, continuing to monitor the data bus.

11. A controlled area network diagnostic instrument for diagnosis and evaluation of electronic components on a vehicle control system on a mobile vehicle, the vehicle control system including electrical system controllers on the vehicle, the electrical controllers communicating over a serial data bus, the serial data bus having a communication port, and the controllers including a gauge cluster that may include indications of vehicle status, comprising:
  a processor including a graphics display;
  a communications port for communicating with the vehicle data bus communication port;
  said processor programmed to graphically provide a visual image of a mock gauge cluster on said display, said mock gauge cluster having the appearance of the actual vehicle gauge cluster; and
  said processor programmed for the steps of:
    upon installation on the data bus, initiating a data bus channel; initiating variables;
    querying along said common data bus to determine current conditions; accepting user adjustments of mock gauge cluster conditions; and
    constructing a data bus message with correct ID and message data and sending the message along said data bus to a controller that controls the particular condition to be changed;
  continuing to monitor said data bus for changes of current conditions.

* * * * *